United States Patent [19]
Smith, Jr. et al.

[11] Patent Number: 6,049,370
[45] Date of Patent: Apr. 11, 2000

[54] LIQUID CRYSTAL LIGHT VALVES USING INTERNAL, FIXED SPACERS AND METHOD OF INCORPORATING SAME

[75] Inventors: Willis H. Smith, Jr.; John H. Erdmann, both of Newbury Park; Philip G. Reif, Chatsworth, all of Calif.

[73] Assignee: Hughes Aircraft Company, Los Angeles, Calif.

[21] Appl. No.: 08/340,008

[22] Filed: Nov. 15, 1994

Related U.S. Application Data

[63] Continuation of application No. 08/009,501, Jan. 26, 1993, abandoned.

[51] Int. Cl.[7] .................................................. G02F 1/1339
[52] U.S. Cl. ........................ 349/156; 349/125; 349/187
[58] Field of Search ........................... 359/75, 76, 77, 359/78, 81, 82, 500, 72; 204/192.23

[56] References Cited

U.S. PATENT DOCUMENTS

| | | | |
|---|---|---|---|
| 4,030,997 | 6/1977 | Miller et al. | 204/192 E |
| 4,364,168 | 12/1982 | Matsuyama et al. | 359/80 |
| 4,390,245 | 6/1983 | Shimizu et al. | 350/343 |
| 4,422,731 | 12/1983 | Droguet et al. | 359/81 |
| 4,464,134 | 8/1984 | Lackner et al. | 445/24 |
| 4,470,668 | 9/1984 | Inoue et al. | 359/80 |
| 4,640,584 | 2/1987 | Tsubakimoto et al. | 359/81 |
| 4,653,864 | 3/1987 | Baron et al. | 359/81 |
| 4,679,910 | 7/1987 | Efron et al. | 359/72 |
| 4,682,858 | 7/1987 | Kanbe et al. | 359/81 |
| 4,705,359 | 11/1987 | Amstutz et al. | 359/76 |
| 4,763,995 | 8/1988 | Katagiri et al. | 359/76 |
| 4,778,259 | 10/1988 | Kitayama et al. | 359/76 |
| 4,874,461 | 10/1989 | Sato et al. | 359/81 |
| 4,897,290 | 1/1990 | Terasaka et al. | 359/76 |
| 4,924,243 | 5/1990 | Sato et al. | 359/81 |
| 4,983,429 | 1/1991 | Takayanagi et al. | 359/81 |
| 5,011,267 | 4/1991 | Miller et al. | 350/340 |
| 5,268,782 | 12/1993 | Wenz et al. | 359/81 |
| 5,350,498 | 9/1994 | Smith, Jr. et al. | 204/192.23 |

FOREIGN PATENT DOCUMENTS

| | | |
|---|---|---|
| 0288910 | 2/1988 | European Pat. Off. . |
| 0417573A3 | 3/1991 | European Pat. Off. . |
| 2157452 | 10/1985 | United Kingdom . |
| WO8605283 | 9/1986 | WIPO . |

OTHER PUBLICATIONS

"Developments of reflection mode liquid crystal light valves using $Bi_{12}SiO_{20}$ as the photoconductor", W. L. Baillie, IEEE Proceedings J. Optoelectronics, vol. 134, No. 6, Dec. 1987, pp. 326–332.
Patent Abstracts of Japan vol.8, No.82 (P–268)(1519) Apr. 14, 1984, & JP–A–59–000 131 (Tokyo Shibaura) Jan. 5, 1984, abstract.
Patent Abstracts of Japn vol.7, No.105, (P–195)(1250) May 7, 1983 & JP–A–58–027–126 (Nippon Denki) Feb. 17, 1983, abstract.
W.P. Bleha, "Progress in Liquid Crystal Light Valves", in *Laser Focus/Electro–Optics*, pp. 111–120 (Oct. 1983).

*Primary Examiner*—William L. Sikes
*Assistant Examiner*—Tai V. Duong
*Attorney, Agent, or Firm*—V. D. Duraiswamy; Wanda Denson-Low

[57] ABSTRACT

An improved liquid crystal display cell (34) comprising two substrates (108, 124) spaced apart and containing a quantity of liquid crystal mixture (18) therebetween, in which the substrates have facing surfaces (108', 124') coated with a continuous, electrically conducting material (38, 36), is provided with an array of spacer pads (40) at a pre-selected distance apart from each other, having a pre-selected height to maintain a given spacing between the substrates, and having a pre-selected cross-section that avoids substantial interference with the display properties of the liquid crystal display cell.

9 Claims, 3 Drawing Sheets

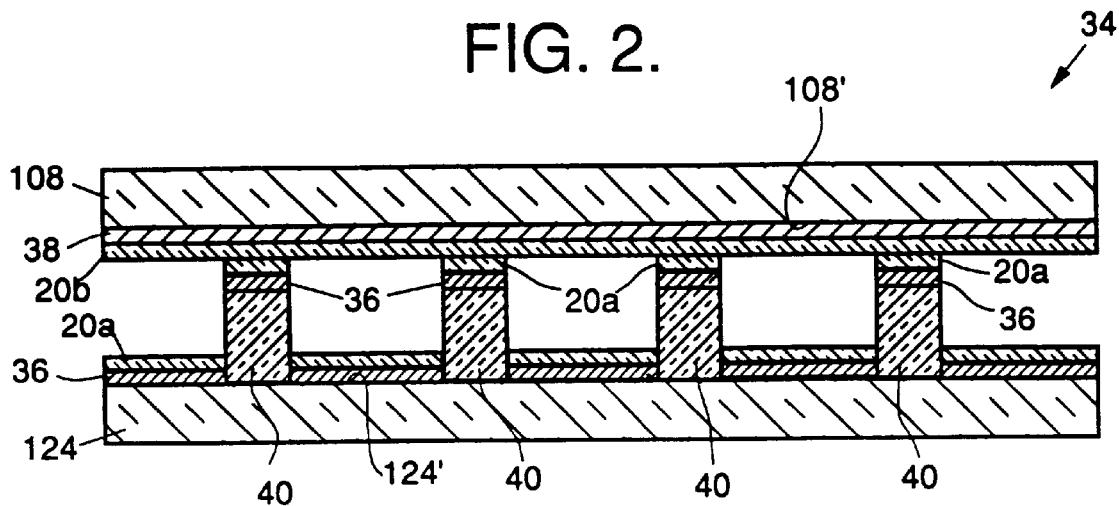
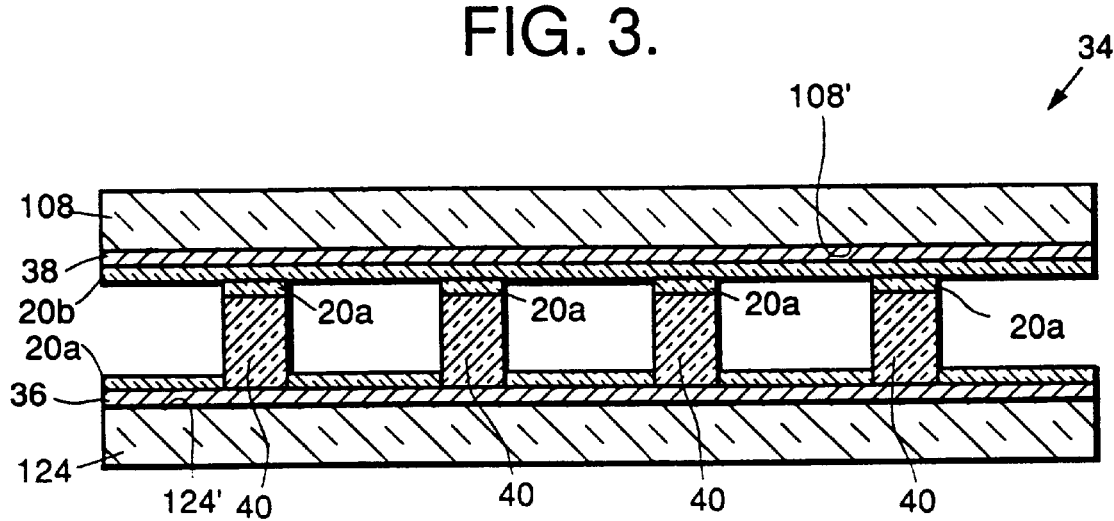

LIQUID CRYSTAL LIGHT VALVES USING INTERNAL, FIXED SPACERS AND METHOD OF INCORPORATING SAME

This is a continuation application Ser. No. 08/009.501 filed Jan. 26, 1993, now abandoned.

BACKGROUND OF THE INVENTION

1. Field of the Invention

The present invention relates generally to liquid crystals, and, more particularly, to an improved configuration in a liquid crystal light valve which includes a new spacing technique for uniform and controllable liquid crystal layer thicknesses.

2. Description of Related Art

One type of liquid crystal electro-optical device is constructed by placing a thin layer of liquid crystal between two transparent plates, or one transparent plate and one mirrored plate, that have each been coated with a layer of an electrical conductor on its interior face. When no electric field is applied (field-OFF) between the conductive layers, the director of the liquid crystal is in one state. (The "director" of the liquid crystal is the macroscopic direction of the long molecular axis of the liquid crystal molecules.) When an electric field is applied (field-ON), the director reorients to another state. Because the liquid crystal is birefringent, the two states will have different refractive indices. The movement of the director causes a polarization re-orientation as the light passes through the liquid crystal layer. The state change responsive to an applied electric field is the basis for liquid crystal devices that control light, such as displays and projectors.

In its usual form, a liquid crystal light valve (LCLV) is a device that modulates a polarized projection light beam on a pixel-by-pixel basis as it passes through a liquid crystal layer. A photoactivated LCLV performs the pixelized modulation with a writing beam directed against the backside of a reflective-mode liquid crystal layer.

A simplified version of a photoactivated LCLV includes a transparent input substrate, usually comprising glass, upon which is formed a transparent back electrode layer, such as indium tin oxide or $P^{++}$ semiconductor, and a layer of photoconductor material, such as silicon or cadmium sulfide. A light-blocking layer, such as $SiO_2$ or CdTe, prevents light entering the readout side of the device from entering the photoconductor, while a dielectric or metal matrix mirror on the readout side of the light-blocking layer reflects a readout beam. A liquid crystal layer is sandwiched between alignment layers on the readout side of the mirror, with a counter-electrode layer and a front transparent substrate formed in turn on the readout side of the liquid crystal cell.

An AC voltage source is connected across the back electrode and counter electrode to establish a bias that sets an operating point for the liquid crystal. In operation, an input image from an optical source such as a cathode ray tube (CRT), a scanning laser, or the like is applied to the input side of the LCLV, while a linearly polarized readout beam is transmitted through the LC cell and reflected back from the mirror through a crossed polarizer. The input image produces a corresponding spatial voltage distribution across the LC layer, altering the localized alignment of the liquid crystal in accordance with the applied voltage pattern. This results in a spatial modulation of the readout beam, permitting a transfer of information from the input image to the readout beam.

The operation of this and other types of liquid crystal light valves is discussed in greater detail in numerous technical publications; see, for example, "Progress in Liquid Crystal Light Valves", by W. P. Bleha, in Laser Focus/Electro-Optics, October 1983, pages 111–120.

Previous versions of liquid crystal light valves (LCLVS) had relatively poor LC layer thickness uniformity, but due to the slower response and >4 μm thick liquid crystal (LC) layers, spacer pads on the perimeter of the display satisfied operational requirements.

Proposed liquid crystal light valves operating at TV-rates will have an LC thickness in the range of 3 to 4 μm. A desire to reduce the size of the LCLV projector has resulted in high temperatures that may cause the substrates of the LCLV to bend. For these reasons, it has become necessary to place spacers into the LC layer throughout the viewing area of the display. A fast, inexpensive, and dependable method for placing these spacers into the display is an important factor in the success of the commercial venture.

Presently, spacer particles, such as glass fibers or spheres, are employed. See, for example, K. Shimizu, et al, "Optical Display Cell of Even Thickness Using Adhesive Means and Separate Adhesive-Free Spacers," U.S. Pat. No. 4,390,245, issued Jun. 28, 1983.

However, spacer particles tend to cluster, resulting in overcrowding in some regions, which reduces the active area of the display, while leaving other regions depleted, causing a possible thickness variation in the display. Depositing spacer particles in a consistently uniform manner can be very expensive. In these techniques, dust particles are also trapped on the substrate surface along with the spacer particles. Finally, in order to safely maintain a uniform separation between two substrates, too many spacers are often deposited, resulting in a poor display or device. Machines to perform this task with reasonable repeatability are very expensive.

Peripheral spacers, which have been used in the prior art, are not sufficient means to maintain uniform separation when the substrates bend.

Thus, there remains a need for a means for spacing the substrates employed in liquid crystal display cells a fixed distance without substantially interfering with display properties.

SUMMARY OF THE INVENTION

In accordance with the invention, an improved liquid crystal display cell comprising two substrates spaced apart and containing a quantity of liquid crystal mixture therebetween, in which the substrates have facing surfaces coated with a continuous, electrically conducting material, is provided with an array of spacer pads at a pre-selected distance apart from each other, having a pre-selected height to maintain a given spacing between the substrates, and having a pre-selected cross-section that avoids substantial interference with the display properties of the liquid crystal display cell.

The liquid crystal display cell is assembled by
(a) providing a first of the substrates;
(b) in either order, forming an array of spacer pads and the continuous, electrically conducting, material on a major surface of the first substrate;
(c) forming a layer of silica over the major surface of the substrate;
(d) providing a second of the substrates coated with (1) the continuous, electrically conducting, material on a major surface thereof and (2) the layer of silica thereon;
(e) assembling the substrates so that the coated surfaces are facing each other and are maintained spaced apart by the spacer pads to provide a region bounded by the perimeter of the two substrates; and (f) sealing the perimeter of the two substrates and filling the region with the liquid crystal mixture to provide the display cell.

The advantages of fixed spacers over spacer particles, such as glass fibers or spheres, are significant. The fixed spacers of the present invention can be deposited in line with techniques already incorporated into the manufacturing of liquid crystal light valves. Spacer pads of $SiO_2$ can be deposited using the technique of ion-beam sputtering in existing apparatus, which is already commercially available. Ion-beam sputtering is a simple, low cost, and relatively fast method. The spacer pads can also be formed by reactive etching techniques, either chemical or plasma, that are well-known. The spacers of interest in this invention range from 1 to 25 μm in height, and from 1 to 250 μm in diameter. The actual diameter of the spacer is determined to be less than the resolution of the specific display or device application.

BRIEF DESCRIPTION OF THE DRAWINGS

FIG. 2 is a side elevational view of one configuration of the liquid crystal layer in a liquid crystal light valve employing one embodiment of a spacer of the present invention; and FIG. 3 is a side elevational view of another configuration of the liquid crystal layer in an LCLV employing a second embodiment of a spacer of the present invention.

DESCRIPTION OF THE PREFERRED EMBODIMENTS

Figure 1:
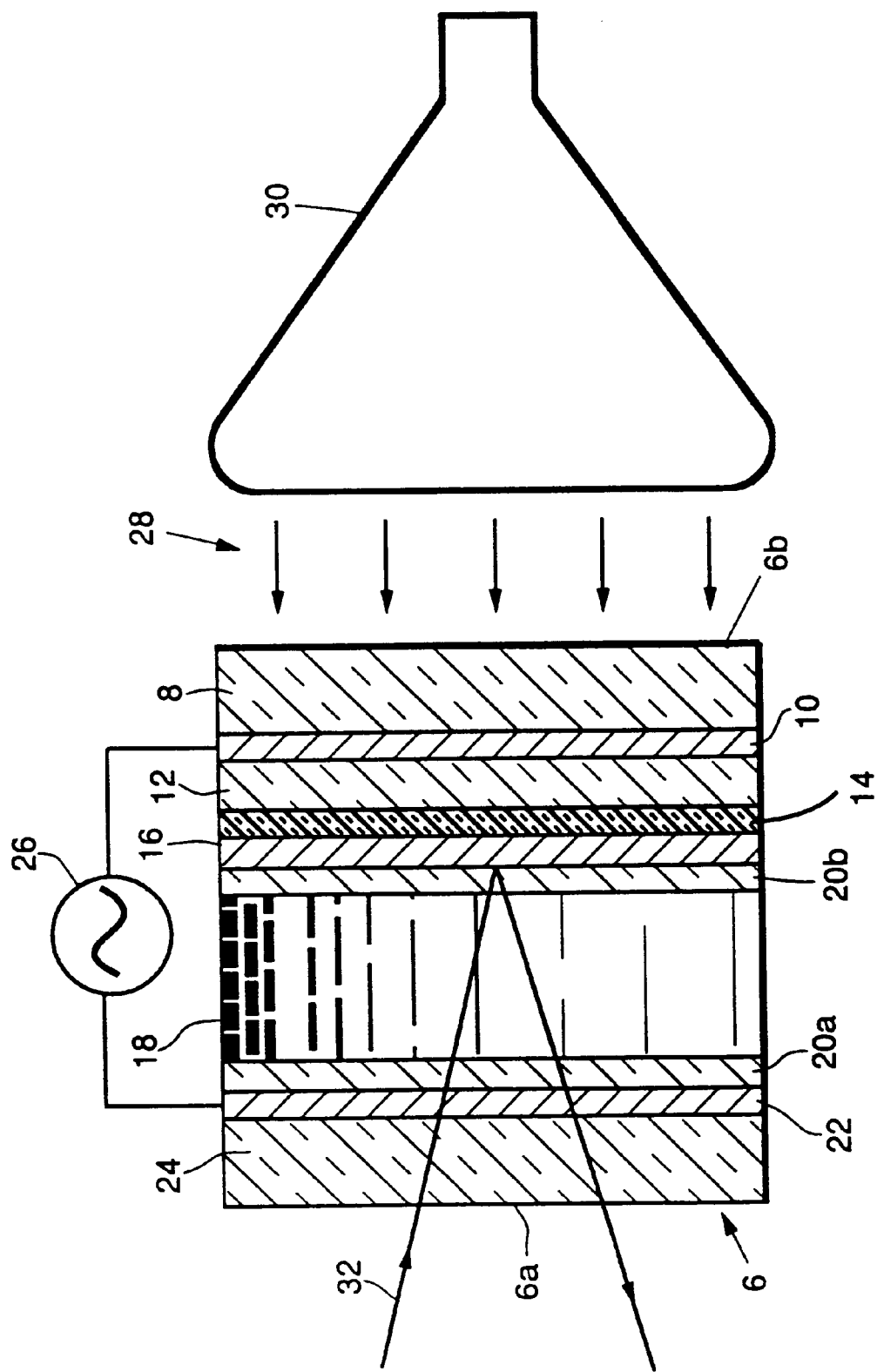
FIG. 1 is a simplified diagram of a known photoactivated liquid crystal light valve.

The simplified version of a photoactivated LCLV 6 described earlier is depicted in FIG. 1 and includes a transparent input substrate 8, usually comprising glass, upon which is formed a transparent back electrode layer 10, such as indium tin oxide or P$^{++}$ semiconductor, and a layer 12 of photoconductor material, such as silicon or cadmium sulfide. A light-blocking layer 14, such as $SiO_2$ or CdTe, prevents light entering the readout side 6*a* of the device 6 from entering the photoconductor 12, while a dielectric or metal matrix mirror 16 on the readout side of the light-blocking layer 14 reflects a readout beam 32. A liquid crystal layer 18 is sandwiched between alignment layers 20*a*, 20*b* on the readout side 6*a* of the mirror 16, with a counter-electrode layer 22 and a front transparent substrate 24 formed in turn on the readout side of the liquid crystal cell 6.

An AC voltage source 26 is connected across the back electrode 10 and counter-electrode 22 to establish a bias that sets an operating point for the liquid crystal. In operation, an input image 28 from an optical source 30 such as a cathode ray tube (CRT), a scanning laser, or the like is applied to the input side 6*b* of the LCLV 6, while a linearly polarized readout beam 32 is transmitted through the LC cell 18 and reflected back from the mirror 16 through a crossed polarizer (not shown). The input image 28 produces a corresponding spatial voltage distribution across the LC layer 18, altering the localized alignment of the liquid crystal in accordance with the applied voltage pattern. This results in a spatial modulation of the readout beam 32, permitting a transfer of information from the input image 28 to the readout beam.

In the present invention, spacers (as used herein, the term "spacers" refers to any object used to maintain a set distance between two substrates) can be placed above and beneath a continuous conductive layer of indium-tin oxide (ITO) and a liquid crystal alignment layer such as disclosed in previous patents issued to the same assignee as the present application. These patents include U.S. Pat. Nos. 5,011,267; 4,464,134; and 4,030,997.

In a preferred alignment process, which is disclosed in application Ser. No. 07/715,537, filed Jun. 14, 1991, and assigned to the same assignee as the present application, a substrate is treated prior to use to induce a near-perpendicular orientation of the liquid crystal director relative to the substrate. A layer of silica is deposited on the substrate surface by, e.g., in-line magnetron sputtering as the substrate is moved past the sputtering target. The silica-coated substrate is subsequently treated with a long-chain alcohol. The alcohol-treated substrate is then covered with a layer of liquid crystal, the director of the liquid crystal assuming a field-OFF state tilted about 1° to 3° from the perpendicular toward an azimuthal direction parallel to the direction of movement of the substrate during deposition. This approach is referred to herein as the "moving deposition" (MD) alignment method.

The spacers in accordance with the present invention can be fixed in a predetermined distribution pattern, with a density sufficient to maintain the separation distance, and sparse enough so as to not degrade the quality of the display or device. The spacers can be deposited or created on the substrate before the alignment layer is deposited because, with the MD alignment method, it is possible to uniformly align liquid crystal (LC) on curved, uneven, and stepped surfaces. An insulating layer of $SiO_2$ prevents shorting between the substrates when the spacer is beneath the ITO or when the spacer is composed of a conductive material.

The method of maintaining uniform separation between two substrates described in this invention is inexpensive and reliable. It will maintain the separation when the substrates bend due to extreme thermal changes, or any other stress inducing process. The procedure can be easily incorporated into the LCLV production processes.

Figure 4:
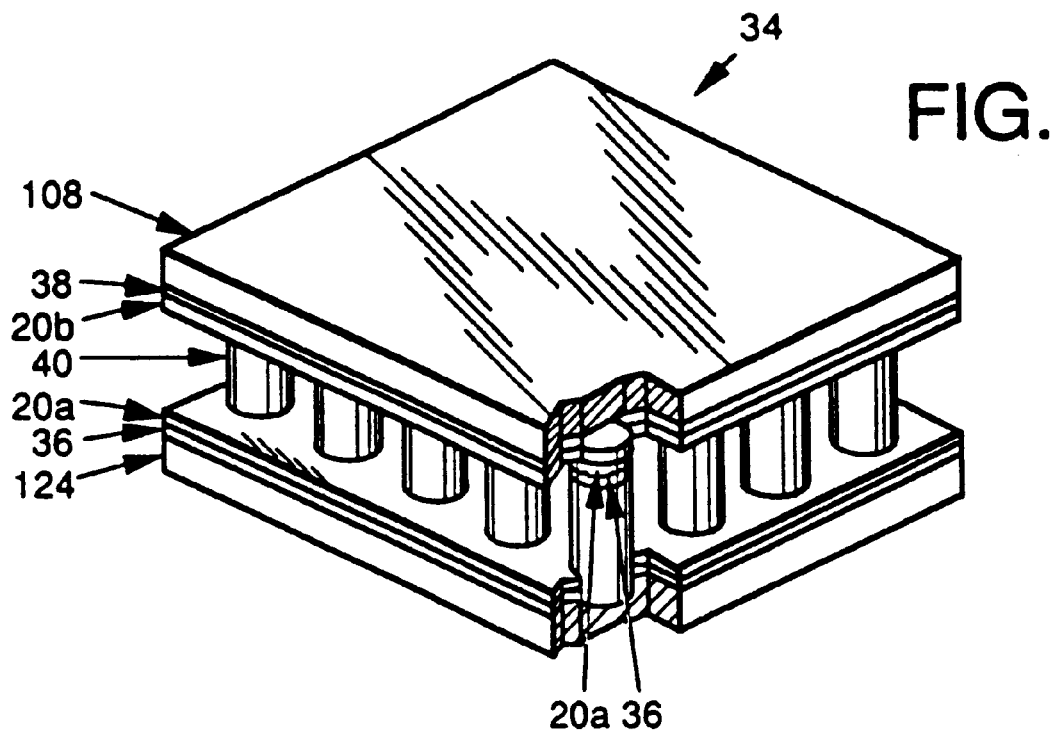
FIG. 4 is a perspective view of the configuration illustrated in FIG. 2.
Figure 5:
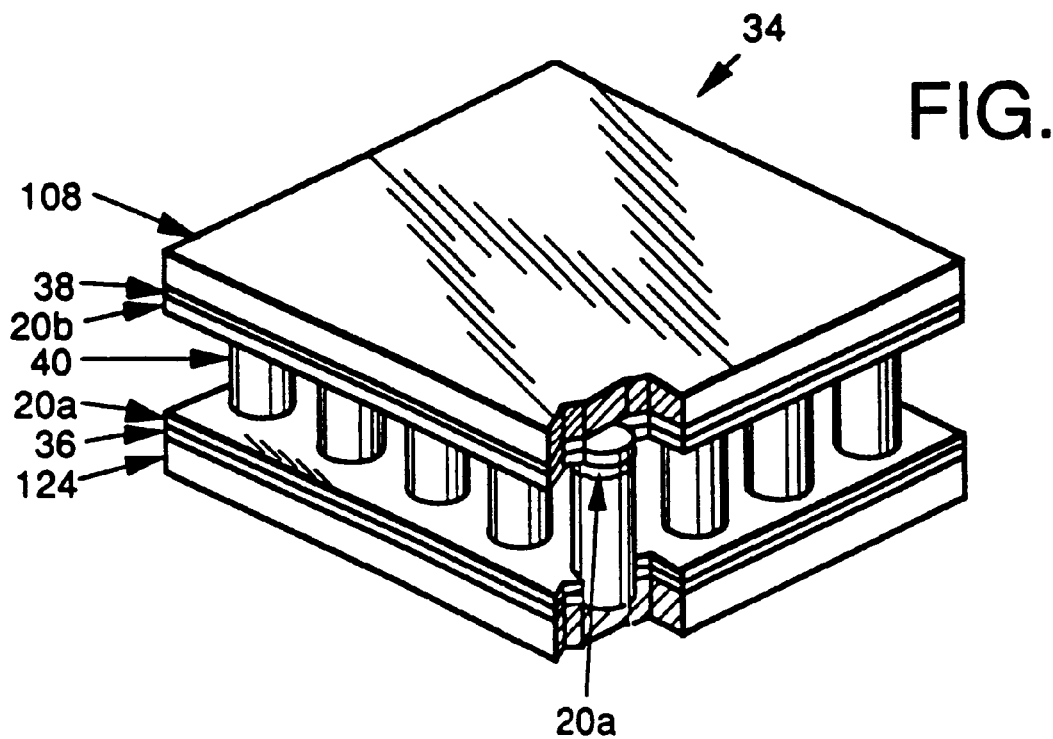
FIG. 5 is a perspective view of the configuration illustrated in FIG. 3.

Two examples of the configuration of this invention are illustrated in FIGS. 2 and 3. FIG. 2 shows the spacer pads placed on the substrate with continuous layers of ITO and an $SiO_2$-based LC alignment layer deposited above. FIG. 3 shows the spacer pads placed between the continuous ITO and $SiO_2$ layers. FIGS. 4 and 5 are perspective views of the configurations illustrated in FIGS. 2 and 3, respectively.

In FIGS. 2 and 3, a liquid crystal display cell 34 includes two glass substrates 108, 124. On the surface 124' of substrate 124 is formed an electrically conducting layer 36, such as indium tin oxide (ITO). A similar electrically conducting layer 38 is formed on the surface 108' of substrate 108. A layer of silica 20*a* is formed on the ITO layer 36. A similar layer of silica 20*b* is formed on the ITO layer 38. The formation of the silica layers is taught in the above-mentioned patents and patent application, and is used to orient the liquid crystal (not shown in the Figures), as described therein.

In accordance with the invention, a plurality of spacer pads 40 is formed over the surface 124' of substrate 124. While FIGS. 2 and 3 depict a row of such spacer pads 40, it will be appreciated that the spacer pads in fact form a 2-dimensional array across the surface of the substrate 124.

The spacer pads 40 may be formed directly on the surface 124', a is shown in FIG. 2, or may be formed on the ITO layer 36, as shown in FIG. 3. In either event, once the spacer pads 40 have been formed, the top substrate 108 may be placed on top of the spacer pads so that the silica layer 20b contacts the tops of the spacer pads. The edges around the perimeter of the two substrates 108 and 124 are then sealed and the space between them is filled with the liquid crystal (not shown in FIGS. 2 and 3, but shown in FIG. 1), as taught in the above-mentioned patents and patent application, to form the liquid crystal display cell 34.

The spacer pads 40 can be formed with heights ranging from about 1 to 50 μm, with cross-sections covering a range of about 1 to 250 μm; the cross-sectional shape of the spacer pads is immaterial, and may be, for example, circular or square. The spacing between the spacer pads 40 ranges from about 0.010 to 2.5 cm.

The size of the spacer pads 40 and the spacing between the spacer pads is dictated by the use. If the device 34 is small or is required to respond very quickly, then the spacer pads 40 should be rather closely spaced. If speed of the device is not a factor, then the spacer pads 40 can be made larger and spaced further apart. As an example, for a liquid crystal light valve, the cross-sectional dimension may be about 3 to 4 μm and the spacing may be about 500 μm on center, while for a quarter-wave plate (out of the focal plane of the device), the cross-sectional dimension can be made somewhat larger than for the LCLV and the spacing may be about 1 cm on center.

A variety of materials may be used to form the spacer pads 40, including an oxide, such as silica or indium tin oxide, a metal, such as chromium, aluminum, or gold, and polymers, such as polyimides or photoresist materials. The spacer pads 40 are formed by depositing a layer of one of the foregoing materials to the desired thickness, such as by sputtering or evaporation or other conventional deposition process, and, employing conventional photolithographic techniques of patterning, exposing, and developing, the unwanted material is removed, leaving the spacer pads of the desired cross-sectional dimension and spacing.

Both FIGS. 2 and 3 depict a layer (ITO layer 36 and silica layer 20a in FIG. 2; silica layer 20a in FIG. 3) on top of the spacer pads 40. This arises from the blanket deposition of these materials on the surface 124' of substrate 124 and plays no role in the operation of the device.

EXAMPLES

Example 1

An experiment was performed to show evidence of reduction to practice. The experiment would also determine if the $SiO_2$ layer would prevent shorting between top substrate and the ITO on top of (or in) the spacer pads, and if the spacer pad would distort the LC alignment by affecting the alignment layer or by producing stray field lines in the voltage-ON state of the device. The device fabricated was similar to that shown in FIG. 2.

The test cell was assembled from two optical ¼-λ flats of BK7A glass. The dimensions of the substrates were 1.24 inch ×1.75 inch ×0.5 inch (3.15 cm×4.45 cm×1.27 cm). $SiO_2$ spacer pads 2.5 μm high and 250 μm in diameter were deposited by electron-beam sputtering. Next, a continuous 400 Å layer of ITO was deposited over the entire substrate. Then, a 1,300 Å layer of $SiO_2$ was deposited for the MD alignment and to electrically isolate the two substrates. Next, the substrate was treated with an alcohol for inducing tilted-perpendicular alignment of liquid crystals. Finally, the test cell was pre-sealed and vacuum filled with a negative dielectric anisotropy liquid crystal material.

The test cell had very low transmission with no applied voltage when it was viewed between crossed polarizers. This result demonstrated that the MD alignment layer could be applied after the spacers were formed with no distortion. A 10 KHz AC voltage was applied to the substrates of the test cell. The transmission of the cell increased uniformly to a maximum at about 7 $V_{rms}$. There was no observable misalignment around the spacers. This result is significant when the spacers are in the viewing area of the display or device.

Example 2

A similar experiment to that described in Example 1 was performed. In this experiment, a test cell was assembled from two optical ¼-Å flats of BK7A glass. The dimensions of the substrates were 1.24 inch×1.75 inch×0.5 inch (3.15 cm×4.45 cm×1.27 cm). Aluminum spacers were formed by a chemical etching process. The resulting spacers were 3 μm high with a square cross-section of 3.3×3.3 μm. ITO and the MD alignment layer were deposited in the same manner as mentioned above. The test cell was filled with another liquid crystal material. This test cell also had positive results. Misalignment regions surrounding the 3.3 μm wide spacers could not be detected at a magnification of 200× in either the voltage-ON or -OFF states.

Thus, there has been disclosed a liquid crystal display cell comprising two substrates spaced apart by a two-dimensional array of spacers. It will be readily apparent to those of ordinary skill in this art that various changes and modifications of an obvious nature may be made, and all such changes and modifications are considered to fall within the scope of the invention, as defined by the appended claims.

What is claimed is:

1. A method of spacing substrates apart in a liquid crystal display cell comprising two substrates separated by a liquid crystal mixture therebetween and coated with a continuous, electrically conducting material, the method comprising:

(a) providing a first substrate of said two substrates;

(b) in either order, forming an array of spacer pads having a pre-selected cross-section that avoids substantial interference with the display properties of said liquid crystal display cell, and said continuous, electrically conducting material on a major surface of said first substrate;

(c) after step (b), forming a liquid crystal alignment layer on said continuous, electrically conducting material, wherein said step of forming comprises:

moving said first substrate past a source of material for said liquid crystal alignment layer;

depositing said liquid crystal alignment layer on said first substrate from said source as said first substrate is moved past the source during deposition so that said layer is also deposited on top of said array of spacer pads, and treating said first substrate with a long-chain alcohol;

(d) providing a second substrate of said two substrates coated with said continuous, electrically conducting material and liquid crystal alignment layer on a major surface thereof, wherein the step of forming said liquid crystal alignment layer on a major surface of said second substrate comprises:

moving said second substrate past said source;

depositing a liquid crystal alignment layer on said second substrate from said source as said second substrate is moved past the source during deposition; and treating said second substrate with a long-chain alcohol;

(e) assembling said two substrates so that said coated surfaces are facing each other and are maintained spaced apart by said spacer pads to provide a region bounded by the perimeter of said two substrates; and (f) sealing said perimeter of said two substrates and filling said region with said liquid crystal mixture to provide said display cell.

2. The method of claim 1 wherein said spacer pads comprise a material selected from the group consisting of oxides, metals, and polymers.

3. The method of claim 2 wherein said oxides are selected from the group consisting of silica and indium tin oxides, wherein said metals are selected from the group consisting of chromium, aluminum, and gold, and wherein said polymers are selected from the group consisting of polyimides and photoresists.

4. The method of claim 1 wherein said spacer pads are spaced apart from each other by a distance ranging from about 0.010 to 2.5 cm.

5. The method of claim 1 wherein said spacer pads have a cross-sectional area ranging from about 1 to 250 $\mu$m.

6. The method of claim 1 wherein said spacer pads have a height ranging from about 1 to 50 $\mu$m.

7. The method of claim 1 wherein said spacer pads are formed directly on the surface of one of said substrates.

8. The method of claim 1 wherein said spacer pads are formed on the surface of said conducting material.

9. The method of claim 1 wherein said liquid crystal alignment layer formed on said electrically conductive electrode layer comprises silica.

* * * * *